US012712636B2

(12) United States Patent
Cai et al.

(10) Patent No.: US 12,712,636 B2
(45) Date of Patent: Aug. 18, 2026

(54) INTERROGATOR UNIT FOR MULTI-SPAN DISTRIBUTED ACOUSTIC SENSING

(71) Applicant: SUBCOM, LLC, Eatontown, NJ (US)

(72) Inventors: Jin-Xing Cai, Morganville, NJ (US); Alexei N. Pilipetskii, Long Branch, NJ (US); Lara Denise Garrett, Red Bank, NJ (US)

(73) Assignee: SubCom, LLC, Eatontown, NJ (US)

( * ) Notice: Subject to any disclaimer, the term of this patent is extended or adjusted under 35 U.S.C. 154(b) by 252 days.

(21) Appl. No.: 18/612,535

(22) Filed: Mar. 21, 2024

(65) Prior Publication Data

US 2025/0300739 A1 Sep. 25, 2025

(51) Int. Cl.

*H04B 10/50* (2013.01)
*G02F 1/01* (2006.01)
*G02F 1/11* (2006.01)
*H04B 10/516* (2013.01)

(52) U.S. Cl.

CPC ......... *H04B 10/505* (2013.01); *G02F 1/0121* (2013.01); *G02F 1/113* (2013.01); *H04B 10/516* (2013.01)

(58) Field of Classification Search

None

See application file for complete search history.

(56) References Cited

U.S. PATENT DOCUMENTS

2012/0297883 A1 11/2012 Kupershmidt
2020/0408572 A1 12/2020 Ronnekleiv
2022/0397448 A1* 12/2022 Pilipetskii ............ H04B 10/071
2023/0269019 A1 8/2023 Huang
2024/0027259 A1 1/2024 Cai
2024/0027260 A1 1/2024 Cai
2024/0027261 A1 1/2024 Cai
2025/0137838 A1 5/2025 Cai

OTHER PUBLICATIONS

Ogden H.M. et al., “Frequency multiplexed coherent φ-OTDR,” Scientific Reports 11-17921, (2021), 12 pages.

Wang Zhaoyong et al., “Ultra-broadband phase-sensitive optical time-domain reflectometry with a temporally sequenced multi-frequency source,” Optics Letters, (2015), vol. 40, Issue 22, 5192-5195.

(Continued)

*Primary Examiner* — David W Lambert

(74) *Attorney, Agent, or Firm* — KDW Firm PLLC

(57) ABSTRACT

An optical communication system and a method. The system includes a distributed acoustic sensing (DAS) interrogation unit. The DAS interrogation unit is configured to generate one or more optical signals for determining a status of one or more portions of an optical communication path, modulate one or more optical signals using one or more measurement pulses and generate one or more modulated optical signals, and transmit one or more modulated optical signals to the one or more portions of the optical communication path. The status of one or more portions of the optical communication path is determined based on one or more reflected signals reflected by one or more portions of the optical communication path in response to one or more modulated optical signals.

16 Claims, 11 Drawing Sheets

(56) References Cited

OTHER PUBLICATIONS

Iida D. et al., "High-frequency distributed acoustic sensing faster than repetition limit with frequency-multiplexed phase-OTDR," Proc OFC 2016, Paper M2D.6.
Sumida M., "Optical Time Domain Reflectometry Using an M-ary FSK Probe and Coherent Detection," Journal Of Lightwave Technology, vol. 14, No. 11, Nov. 1996, pp. 2483-2491.
European search report for EP Application No. 25163925.8, dated Jul. 24, 2025, 10 pages.
SEAFOM, "Measuring Sensor Performance—DAS Parameter Definitions and Tests (SEAFOM-MSP-02)" Feb. 24, 2024, 63 pages.
Bian Huichun et al., "Vibration measurement technique for repeated fiber-optic hydrophone transmission cable system," SPIE/COS Photonics Asia, 2020, SPIE vol. 11554, Advanced Sensor Systems and Applications X; 115541C, Oct. 10, 2020, 7 pages.

* cited by examiner

240

500

510

610
Laser Sweeping Freq [GHz]
250.5
250
249.5
Pulse Amplitude
1
0.8
0.6
0.4
0.2
0
20
22
24
26
28
30
Time [ms]
602
604
606
608
Pulse Amplitude
Laser Sweep Freq
DAS Sig Freq 600
602
604
606
Laser Sweeping Freq [GHz]
500
400
300
200
100
0
Pulse Amplitude
1
0.8
0.6
0.4
0.2
0
0
10
20
30
40
50
Time [ms]
Pulse Amplitude
Laser Sweep Freq
DAS Sig Freq

INTERROGATOR UNIT FOR MULTI-SPAN DISTRIBUTED ACOUSTIC SENSING

TECHNICAL FIELD

This disclosure relates generally to fiber-optic optical communication systems, and in particular to distributed acoustic sensing, and more particularly, to an interrogator unit for distributed acoustic sensing (DAS) of multiple fiber spans in such systems that include multiple optical amplifier pairs disposed along a measurement path, and even more particularly, to a method for using the interrogator unit to perform multi-span sensing in such systems.

BACKGROUND

In a distributed acoustic sensing (DAS) system, a cable containing optical fiber may be used to provide real-time or near real-time distributed strain sensing. In other words, the cable itself may be used as a sensing element to detect or monitor different types of disruptions, interferences, irregularities, activities, whether man-made or naturally occurring events, acoustic vibrations, etc. in the DAS environment (e.g., terrestrial environment, undersea environment). To do so, an optoelectronic device coupled to the optical fiber cable of the DAS system may detect and process reflected light signals (e.g., acoustic frequency strain signals) over a specific distance in the DAS environment.

For example, the DAS system may be based on Rayleigh backscattering (otherwise referred to as a Rayleigh-scattering-based DAS system). In this system, a coherent laser pulse may be sent along an optical fiber, and scattering sites within the optical fiber may cause the fiber to act as a distributed interferometer, e.g., with a gauge length approximately equal to the pulse length. The intensity, frequency and/or phase of any reflected light may be measured as a function of time after transmission of the laser pulse, which is known as coherent optical time domain reflectometry (COTDR).

In some existing systems, telecommunications optical fiber is used as a distributed sensor to detect spatial disturbances contiguously along the transmission/sensing fiber over long distances in real time. However, conventional sensing systems typically require multiple distributed acoustic sensing interrogation units operating at different wavelengths to sense different portions of the optical fiber, particularly when there are disrupting elements such as optical amplifiers along the cable, which then adds substantial structural and operational complexity to and enables a higher error rate in sensing of disturbances by the sensing system.

SUMMARY

In some implementations, the current subject matter relates to an optical communication system. The system may include a distributed acoustic sensing (DAS) interrogation unit. The DAS interrogation unit may be configured to generate one or more optical signals for determining a status of one or more portions of an optical communication path, modulate one or more optical signals using one or more measurement pulses and generate one or more modulated optical signals, and transmit one or more modulated optical signals to one or more portions of the optical communication path. The status of one or more portions of the optical communication path may be determined based on one or more reflected signals reflected by one or more portions of the optical communication path in response to the one or more modulated optical signals.

In some implementations, the current subject matter may include one or more of the following optional features. The optical communication path may be a distributed acoustic sensing optical transmission path. The DAS interrogation unit may include a transmitting optical device configured to transmit one or more modulated optical signals to one or more portions of the optical communication path. The transmitting device may include a laser source configured to generate one or more optical signals for determining the status of one or more portions of an optical communication path. The laser source may include at least one of the following: a sweeping laser, a continuous wave laser, a multi-tone frequency laser, and any combination thereof.

In some implementations, the transmitting device may include a pulse generator configured to generate one or more measurement pulses for modulating one or more optical signals. The transmitting device may include a modulator configured to modulate one or more optical signals using one or more measurement pulses generated by the pulse generator. The modulator may include at least one of the following: an acousto-optic modulator, an electrical absorption modulator, an electric-optic modulator (EOM), and any combination thereof. A frequency of at least one modulated optical signal in one or more modulated optical signals may be determined in accordance with at least one portion of the optical communication path in one or more portions of the optical communication path, wherein the at least one modulated optical signal may be used to determine status of the at least one portion.

In some implementations, the DAS interrogator unit may include one or more receiving optical devices communicatively coupled to the optical transmission path and may be configured to receive a plurality of backscattered signals generated by each portion in one or more portions of the optical transmission path in response to one or more modulated optical signals transmitted by the transmitting optical device.

In some implementations, one or more optical signals may include an interrogation signal.

In some implementations, the current subject matter relates to a method for monitoring an optical transmission path in an optical transmission system, where the optical transmission system may include a distributed acoustic sensing (DAS) interrogation unit. The method may include generating one or more optical signals for determining a status of one or more portions of an optical communication path, modulating one or more optical signals using one or more measurement pulses and generate one or more modulated optical signals, transmitting one or more modulated optical signals to one or more portions of the optical communication path, and determining the status of one or more portions of the optical communication path based on one or more reflected signals reflected by one or more portions of the optical communication path in response to one or more modulated optical signals. In some implementations, the current subject matter may include one or more optional features discussed above.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
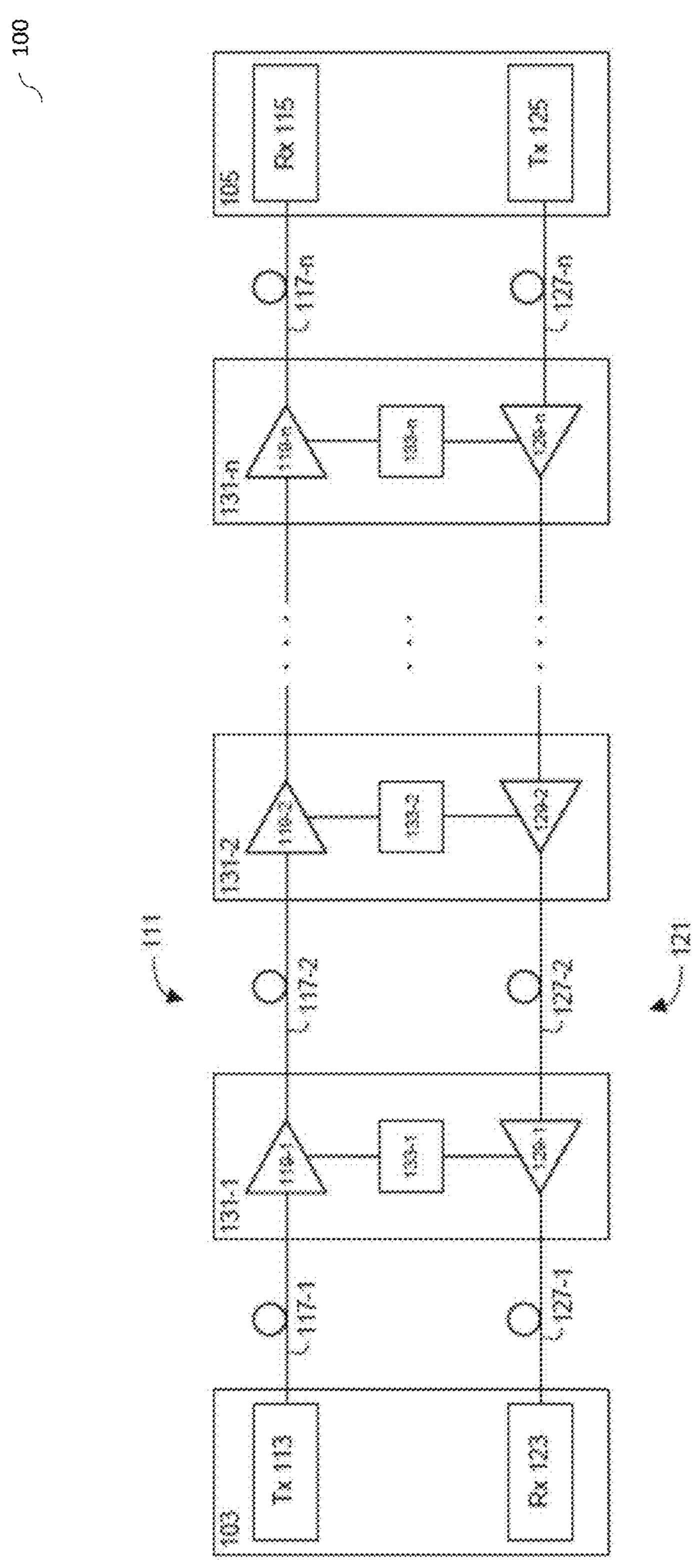
FIG. 1 illustrates an exemplary optical communication system.

To address these and potentially other deficiencies of currently available solutions, one or more implementations of the current subject matter relate to methods, systems, articles of manufacture, and the like that can, among other possible advantages, provide an interrogator unit transmitter for multi-span distributed acoustic sensing (DAS) systems, and in particular, to an interrogator unit that may include multiple wavelength/multiple frequency components that may be used in such multi-span DAS systems.

In a distributed acoustic sensing (DAS) system, a DAS signal (e.g., light signal) may be transmitted by a DAS device (e.g., DAS interrogator) from an outbound optical cable. This DAS signal may be referred to as a transmit DAS signal. The transmit DAS signal may propagate along a first optical fiber of a bidirectional, dedicated and/or any other fiber pair of the optical cable in a first direction and may be periodically amplified by one or more optical amplifiers spaced along the fiber. Without limitation, a fiber pair may refer to actual fiber pairs, separate cores and/or modes in the same fiber pair, and/or to one or more bidirectional transmission signals in the same core, and/or any other types of fiber pairs.

In some cases, the DAS system may provide undersea optical cable for extending DAS range. For example, DAS range may be extended by transmitting and/or amplifying a DAS signal along multiple spans of a first optical fiber, routing and/or bypassing the DAS signal from the first optical fiber to a second optical fiber that may be different from the first fiber via, for example, a high-loss loopback (HLLB) architecture and/or an amplified-filtered loop back (AFLB) architecture, and returning and/or amplifying the DAS signal along the same multiple spans back to a DAS device. The DAS device may then receive and process the DAS signal to detect and/or determine any changes in the DAS system environment. Moreover, at a predefined distance along the optical cable (e.g., after the "Nth" amplifier along the optical cable), the transmit DAS signal may be returned to the DAS device by routing and/or bypassing the DAS signal to a second optical fiber of the fiber pair of the optical cable using, for example, the HLLB or AFLB architecture.

Accordingly, broader coverage provided by the extended DAS range allows a DAS system to better monitor subsea related activities. For example, the optical cables of the extended DAS system may be used to detect ("hear") and/or monitor earthquakes, sea floor movement, ship signatures, passing of ships, dropping of anchors, dragging of fishing nets, etc. As such, the optical cables may effectively act as microphones to monitor potential issues and/or problems that may occur undersea, such as, for example, aggressions and/or potential aggressions to optical cables of a subsea optical communication system.

In the following description, the term path and/or link may refer to any type of communicative coupling and/or connection and may encompass, but is not limited to, an optical coupling and/or connection, electrical coupling and/or connection, electro-optical coupling and/or connection, electro-mechanical coupling and/or connection, electro-optical-mechanical coupling and/or connection, and/or any other type of coupling and/or connection that is capable of transmitting and/or receiving any type of signal.

FIG. 1 illustrates an exemplary optical communication system 100 having two fibers forming a bi-directional fiber pair, distributed optical amplifiers disposed in both directional optical communication paths and an optical link between the two directional paths at each amplifier pair. The system 100 may use high-bandwidth fiber optics to transmit/receive vast amounts of data over long distances. The bidirectional optical communication system 100 may also be referred to as a long-haul optical communication system. Bidirectional data transmission may be implemented by constructing pairs of optical fibers, cores and/or modes within an optical cable and/or transmitting one or more channels, e.g., wavelength division multiplexed channels, per fiber pair.

The system 100 may include terminals 103 and 105 communicatively coupled using (e.g., unidirectional) optical paths 111, 121. The terminal 103 may include a transmitter 113 and a receiver 123. Likewise, the terminal 105 may include a receiver 115 and a transmitter 125. The transmitter 113 of the terminal 103 may be communicatively coupled to the receiver 115 of the terminal 105 via the path 111. The transmitter 125 of the terminal 105 may be communicatively coupled to the receiver 123 of the terminal 103 via the communication path 121. The paths 111, 121 may form a bidirectional optical fiber pair. For example, the optical path 111 may transmit signal(s), data, information, etc. and/or any combination thereof in one direction, e.g., from the transmitter 113 to the receiver 115. Optical path 121 may transmit signal(s), data, information, etc. and/or any combination thereof in another direction, e.g., from the transmitter 125 to the receiver 123.

Thus, with respect to the terminal 103, the optical path 111 may be referred to as an outbound path and the optical path 121 may be referred to as an inbound path. The optical path 111 may include one or more optical fibers 117-1 to **117-*n* and one or more optical amplifiers 119-1 to 119-*n*, the latter being positioned within respective repeaters 131-1 to 131-*n*. Similarly, the optical path 121 may include one or more optical fibers 127-1 to 127-*n* and one or more optical amplifiers 129-1 to 129-*n*, the latter being positioned within the respective repeaters 131-1 to 131-*n*. The optical fibers 117-1 to 117-*n* and 127-1 to 127-2 may be individual segments of a single optical fiber 117 and/or a single optical fiber 127, respectively, where the segments may be formed by way of coupling of the amplifiers to the optical fibers 117 and 127, as shown in FIG. 1**.

For example, one or more optical amplifiers 119-1 to **119-*n* and/or 129-1 to 129-*n* may be Erbium-doped fiber amplifiers (EDFAs), and/or any other optical amplifiers. Further, while transmitters 113, 115 and receivers 123, 125 are shown as separate components, as can be understood, transmitter 113 and/or receiver 123 may be housed together in a single housing and may form a transponder and/or transceiver at the terminal 103. Similarly, transmitter 115 and receiver 125 may also be housed together in a single housing and may form a transponder and/or transceiver at terminal 105**.

As stated above, the optical path pair (e.g., optical paths 111, 121) may be configured as a set of amplifier pairs 119-1 to **119-*n* and 129-1 to 129-*n* within repeaters 131-1 to 131-*n* communicatively coupled thereto using pairs of optical fibers 117 (e.g., using optical fibers 117-1 to 117-*n*) and 127 (e.g., using optical fibers 127-1 to 127-*n*), which may be included in an optical fiber cable together with other fibers and/or fiber pairs supporting additional path pairs. As discussed above and shown in FIG. 1, for example, each repeater 131-1 to 131-*n* may include at least a pair of respective amplifiers 119-1 to 119-*n*, 129-1 to 129-*n* for each path pair and/or may include additional amplifiers for additional path pairs. As shown in FIG. 1, for example, the repeater 131-1 may include amplifiers 119-1 and 129-1**.

The optical amplifiers 119-1 to **119-*n*, 129-1 to 129-*n* may include EDFAs and/or other rare earth doped fiber amplifiers, e.g., Raman amplifiers, semiconductor optical amplifiers (SOAs). Each repeater 131-1 to 131-*n* may also include respective coupling paths 133-1 to 133-*n* that may be communicatively coupled between optical paths 111, 121**. It may be understood that the term "couple" and/or "coupled" and/or "communicatively coupled", as used herein, may broadly refer to any connection, connecting, coupling, link, and/or linking, direct and/or indirect and/or wired and/or wireless connection, etc. but does not necessarily imply that the coupled components and/or elements are directly connected to each other.

It may be understood that the first and second optical fibers providing the transmit and return paths, respectively, may be included in and/or in form a bidirectional optical fiber pair. The fiber pair may be a standalone DAS-dedicated fiber pair. Alternatively, or in addition, it may be a payload carrying fiber pair, whereby the DAS signal may have a wavelength outside the payload channel wavelengths so that the DAS signal does not interfere with the payload signals. As can be understood, every "Nth" opposing set of amplifiers (e.g., the Nth amplifier coupled to the first optical fiber and the Nth amplifier coupled to the second optical fiber) may be paired and/or housed in the same respective repeater 131-1 to **131-*n***.

Using telecom optical fiber as a distributed sensor to achieve distributed acoustic sensing (DAS) has been used to detect spatial disturbances contiguously along the transmission/sensing fiber over long distances in real time. However, to date, distributed sensing has been limited to fiber lengths in the range of approximately 50 km for typical sensing applications and expanding to 150 km in some research units. Also, in repeater-ed DAS systems with erbium-doped fiber amplifiers (EDFA), it is typical that only the first fiber span that is adjacent to the DAS interrogator unit (IU) (e.g., a DAS transmitter and receiver) can be sensed.

To sense multiple spans in an undersea network, conventional systems typically use multiple DAS interrogator units at different wavelengths. The maximum sensing frequency (in a multi-span sensing system) is determined by the sensing distance (not including the leading fiber spans (e.g., spans that do not have a loop back path, for instance, spans that extend from transmitter/receiver components to first repeater) covered by a particular DAS interrogator unit and corresponds to the total distance between the spans using the same optical filter wavelength. In such systems, the leading fiber spans do not count toward the sensing distance since the Rayleigh backscattering from these spans are filtered using filters at other wavelengths.

Further, to perform multiple span sensing, some sensing systems use time-staggered optical pulses from different DAS interrogator units. Transmitting pulses from different wavelengths with a controlled time offset, not only reduces EDFA transient effects, but also reduces nonlinearities in a transmission/sensing fiber. However, the pulse staggering feature typically requires all DAS interrogator units to be synchronized using a common clock, which adds significant additional complexity and cost. FIG. **2*a* illustrates an example of a sensing system 200** that implements multiple DAS interrogator units to perform multi-span sensing.

The system 200 may include a DAS transmitting component 202, a transmitting combiner component 204, a circulator component 206, a receiving splitter component 210, and a DAS receiving component 212. These components may be communicatively coupled to a DAS subsea system 208. The DAS subsea system 208 may include one or more optical sensing fibers that may be configured to receive one or more sensing signals 209 from the transmitting side of the system 200 and transmit one or more backscattered or reflected sensing signals 215 to the receiving side of the system 200.

Alternatively, or in addition, as shown in FIG. **2*b*, the circulator 206 might not be used in the DAS subsea system 208. In particular, a system 230 that may include the DAS subsea system may be configured to be directly communicatively coupled, e.g., using one or more fiber pairs, to the transmitting combiner component 204, via a connection 235, and/or to the receiving splitter component 210, via connection 237. Connection 235 may be used for carrying optical signals 239 to the DAS subsea system 208 and connection 237 may be used for transmitting optical signals that may include Rayleigh scattering from the DAS subsea system 208 that may be coupled back to the fiber going in a direction opposite to the direction of transmission of signals 239**.

The DAS transmitting component 202 may include one or more DAS transmitters 201 (*a, b, . . . , n*). Each transmitter 201 may be configured to generate and transmit a respective sensing optical signal 203 (*a, b, . . . , n*) at a predetermined wavelength. For example, the transmitter 201*a* may be configured to generate and transmit optical sensing signal 203*a* having wavelength $\lambda_1$; the transmitter 201*b* may be configured to generate and transmit optical sensing signal 203*b* having wavelength $\lambda_2$; and the transmitter 201*n* may be configured to generate and transmit optical sensing signal 203*n* having wavelength $\lambda_n$. The wavelength of optical sensing signals 203 generated by the respective transmitters 201 may be same and/or different. Each transmitter 201 may be configured to generate and transmit optical sensing signals 203 to determine a status of a particular segment, portion and/or span of an optical communication path of the multi-span subsea system 208, where the system 208 may include one or more of such spans.

The signals 203 generated and transmitted by the transmitters 201 may be synchronized using one or more clocks and/or synchronization components 214, which may be communicatively coupled to the transmitters 201. Every time an optical sensing signal 203 is generated and transmitted by a particular transmitter 201 to determine status of a specific span of the system 208, the synchronization component 214 records the time of transmission of the optical sensing signal 203. The system 200 may also record additional parameters of the signals 203, such as, for example, wavelength, frequency, etc. of the signal 203. The parameters of the signals 203 may be used to determine the span of the system 208 to which the signals have been transmitted to. This also allows the system 200 to track reflections produced by the spans of the system 208 in response to the signals 203.

During transmission by the DAS transmitting component 202, the signals 203 may be passed through the transmitting combiner component 204. The component 204 may combine multiple optical sensing signals 203 generated by respective transmitters 201 into a single transmitting optical sensing signal 205. The combiner component 204 may be a dense wavelength division multiplexing (DWDM) component and/or any other type of wavelength combining component, and/or any combination of components. In the combined signal 205, in addition to the specific parameters of the signal 201 (e.g., time, wavelength, frequency, etc.), each optical sensing signal 203 may also have a separate signature and/or identification indicating origin of the signal 201 and/or any other information associated with its transmission.

The combined signal 205 may be passed to the circulator component 206. The circulator component 206 may route transmission of signals to and from the multi-span subsea system 208. For such routing, the circulator component 206 may include ports that may be communicatively coupled to the DAS transmitting component 202 side, DAS receiving component 212 side, and the system 208. For example, the signal 205 from the combiner component 204 may be received on a first port of the circulator component 206 and routed by the circulator component 206 to its second port communicatively coupled to the system 208. Optical sensing signals reflected by one or more spans of the system 208 may be received on the second port of the circulator component 206 and routed to a third port of the circulator component 206 for transmission to the DAS receiving component 212 side. As can be understood, designation of first, second and third for ports of the circulator component 206 is entirely arbitrary and provided herein for illustrative purposes only.

The combined signal 205 may be routed by the circulator component 206 to the system 208 as optical sensing signal (s) 209. The signal(s) 209, and in particular, its specific portions, may traverse the spans of the system 208. For example, a portion of the signal(s) 209 corresponding to the signal 203*a*, as generated/transmitted by the transmitter 201*a*, may be used to sense a first span of the system 208; a portion (e.g., in wavelength and/or in time) of the signal(s) 209 corresponding to the signal 203*b*, as generated/transmitted by the transmitter 201*b*, may be used to sense a second span of the system 208; and a portion of the signal(s) 209 corresponding to the signal 203*n*, as generated/transmitted by the transmitter 201*n*, may be used to sense $n^{th}$ span of the system 208.

One or more (or all spans) may be configured to cause reflections of the respective signals 201 that form the signal(s) 209. For example, the first span of the system 208 may reflect the portion of the signal(s) 209 corresponding to the optical sensing signal 201*a*; the second of the system 208 may reflect the portion of the signal(s) 209 corresponding to the optical sensing signal 201*b*; and the $n^{th}$ span of the system 208 may reflect the portion of the signal(s) 209 corresponding to the optical sensing signal 201*n*. One or more reflections by the spans of the system 208 may be caused by one or more disturbances, interferences, cable breaks, and/or any other conditions. Alternatively, or in addition, optical sensing signals may be reflected by the respective spans without detection of any conditions (e.g., to indicate a normal operating status of the span of the system 208).

The reflected signals may be transmitted as signal(s) 215 to the circulator component 206 and may be received on the second port of the circulator component 206. The circulator component 206 may then route the reflected signal(s) to its third port for transmission as reflected signal(s) 207 to the DAS receiving component 212 side.

During receiving by the DAS receiving component 212, the reflected signal(s) 207 may be passed through the receiving splitter component 210. The component 210 may split reflected signal(s) 207 received from the circulator component 206 into multiple receiving optical sensing signals 213 (*a, b, . . . , n*). The splitter component 210 may be a dense wavelength division multiplexing (DWDM) component and/or any other type of wave splitting component, and/or any combination of components. The signal portions contained in the reflected signal 207 may be separated by the splitter component 210 into signals 213 (*a, b, . . . , n*) and transmitted to specific receiver components 211 (*a, b, . . . , n*) of the DAS receiving component 212, which may be selected using such signal parameters.

Figure 2A:
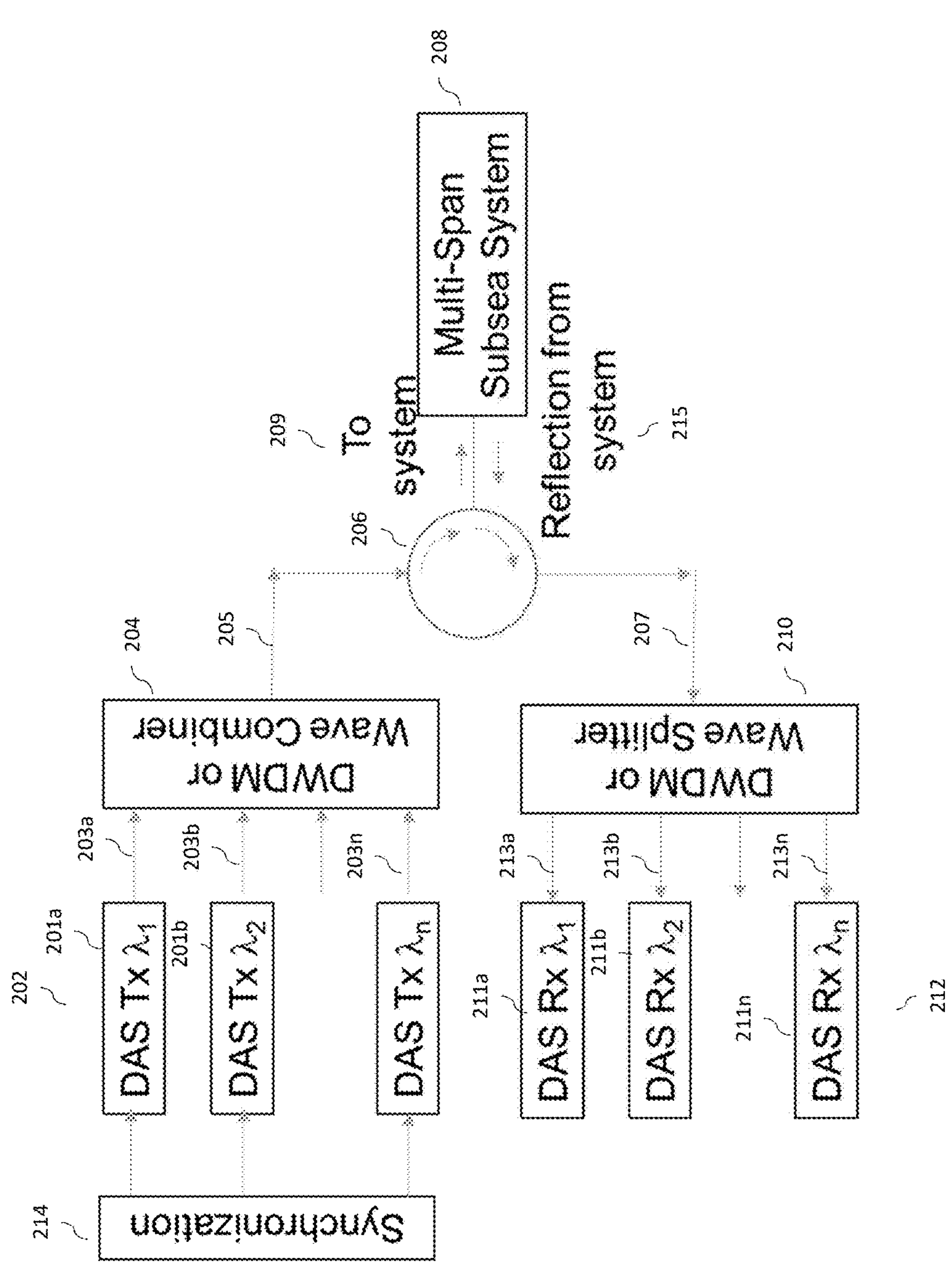
FIGS. 2*a-b* illustrate examples of sensing systems that implement multiple DAS interrogator units to perform multi-span sensing, including time synchronization between multiple interrogator units.
Figure 2B:
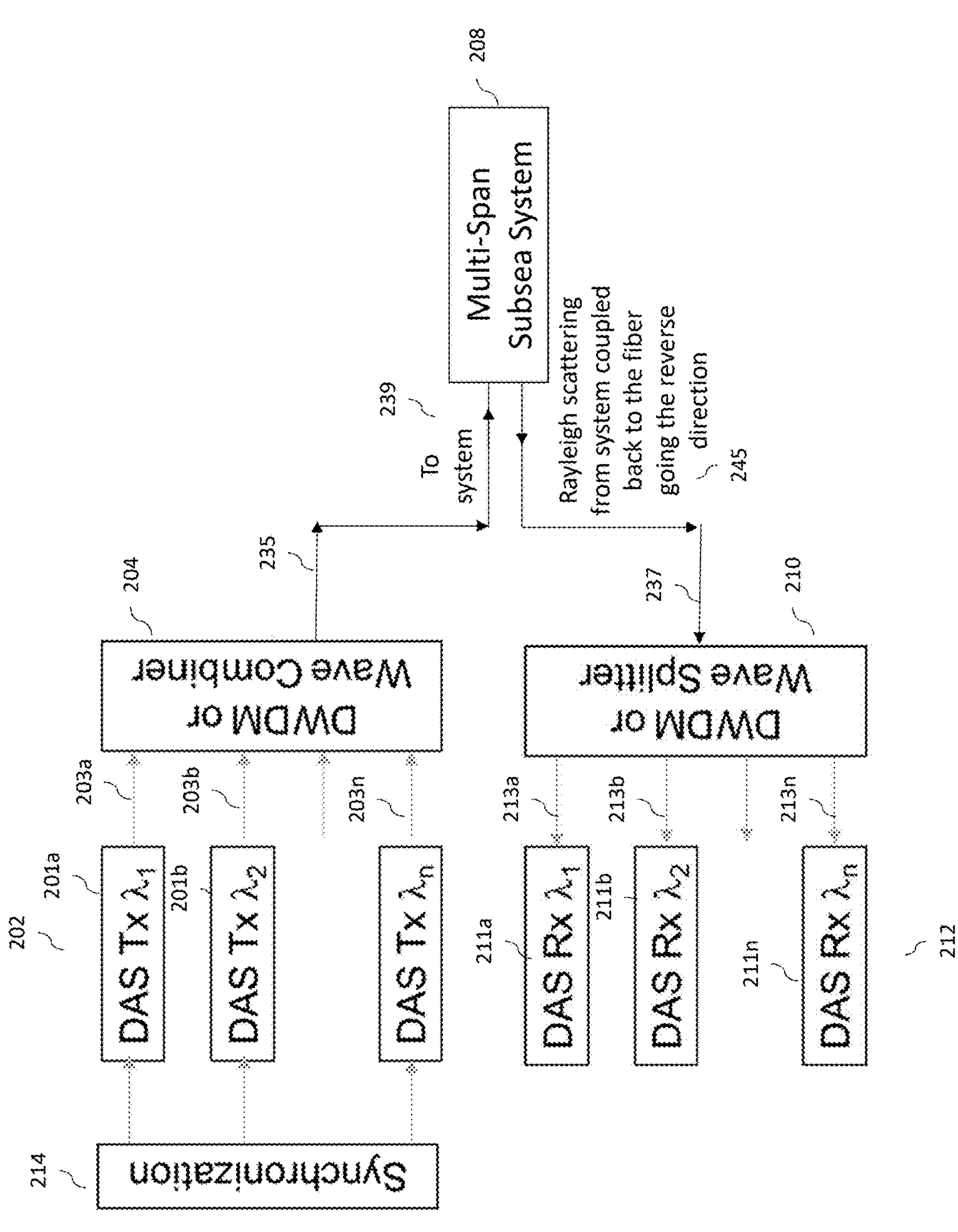
Figure 2C:
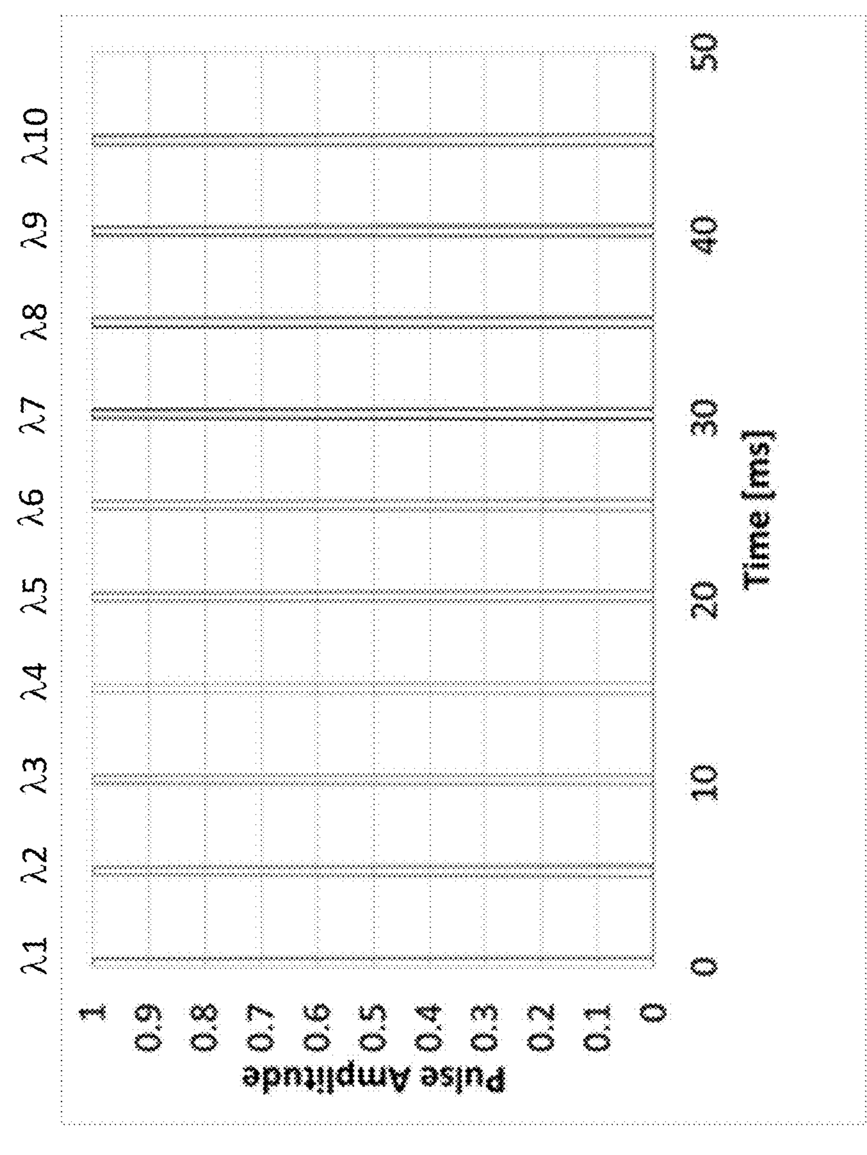
FIG. 2*c* illustrates an example amplitude-time plot illustrating different wavelengths of signals received by the receivers in the sensing systems of FIGS. 2*a-b*, including time offset(s) between return signals for various wavelengths due to the time synchronization shown in FIG. 2*a;*

Each receiver 211 may be configured to receive a respective reflected sensing optical signal 213 (*a, b, . . . , n*) in accordance with one or more reflected signal parameters, e.g., time, wavelength, frequency, phase, signature(s), identification, and/or any other parameters. For example, the receiver 211*a* may be configured to receive reflected optical sensing signal 213*a* having wavelength $\lambda_1$, where the signal 213*a* is a reflection of the signal 203*a* reflected by the first span of the system 208; the receiver 211*b* may be configured to receive reflected optical sensing signal 213*b* having wavelength $\lambda_2$, where the signal 213*b* is a reflection of the signal 203*b* reflected by the second span of the system 208; and the receiver 211*n* may be configured to receive reflected optical sensing signal 213*n* having wavelength $\lambda_n$, where the signal 213*n* is a reflection of the signal 203*n* reflected by the $n^{th}$ span of the system 208. Each receiver 211 may be configured to receive optical sensing signals 213 and determine a status of the corresponding span of the system 208. The DAS receiving component 212 may be configured to use one or more parameters of the received signals 213 (e.g., time, wavelength, frequency, phase, signature(s), identification, and/or any other parameters) to differentiate between each received signal and ascertain whether a particular span of the system 208 is operating and/or has an optical condition (e.g., a breach, an interference, a seismic condition, etc.). FIG. 2*c* illustrates an example amplitude-time plot 240 illustrating different wavelengths $\lambda_n$ (n=1, 2, . . . , 10) of signals transmitted by the transmitters 201. The plot 240 shows 10 different signal wavelengths, which allows sensing over a 10,000-kilometer (km) length of an optical communication path of the system 208 (e.g., each signal wavelengths covers 10 spans each 100 km in length).

As shown in FIG. 2*c*, each DAS wavelength signal may have a short pulse with a small duty cycle, and all 10 wavelengths may be synchronized and staggered in time. In this example, each wavelength covers 1,000 km (not including the leading fibers), and the 10 different wavelengths may be within the C-band and/or L-band of EDFAs. The channel spacing may be similar to the spacing used for data channels in some existing optical transmission systems (e.g., 50 GHz spaced).

In some embodiments, the current subject matter may be configured to perform optical sensing in a multi-span undersea optical communication system using a single DAS transmitter. This can greatly reduce complexity and cost of optical communication system as only a single signal source and a single modulation section may be used. Further, because there is no need for dedicated synchronized circuits in the DAS interrogator unit for the different wavelengths, the optical communication system may perform optical sensing of its communication links/spans in a more efficient manner.

Figure 3:
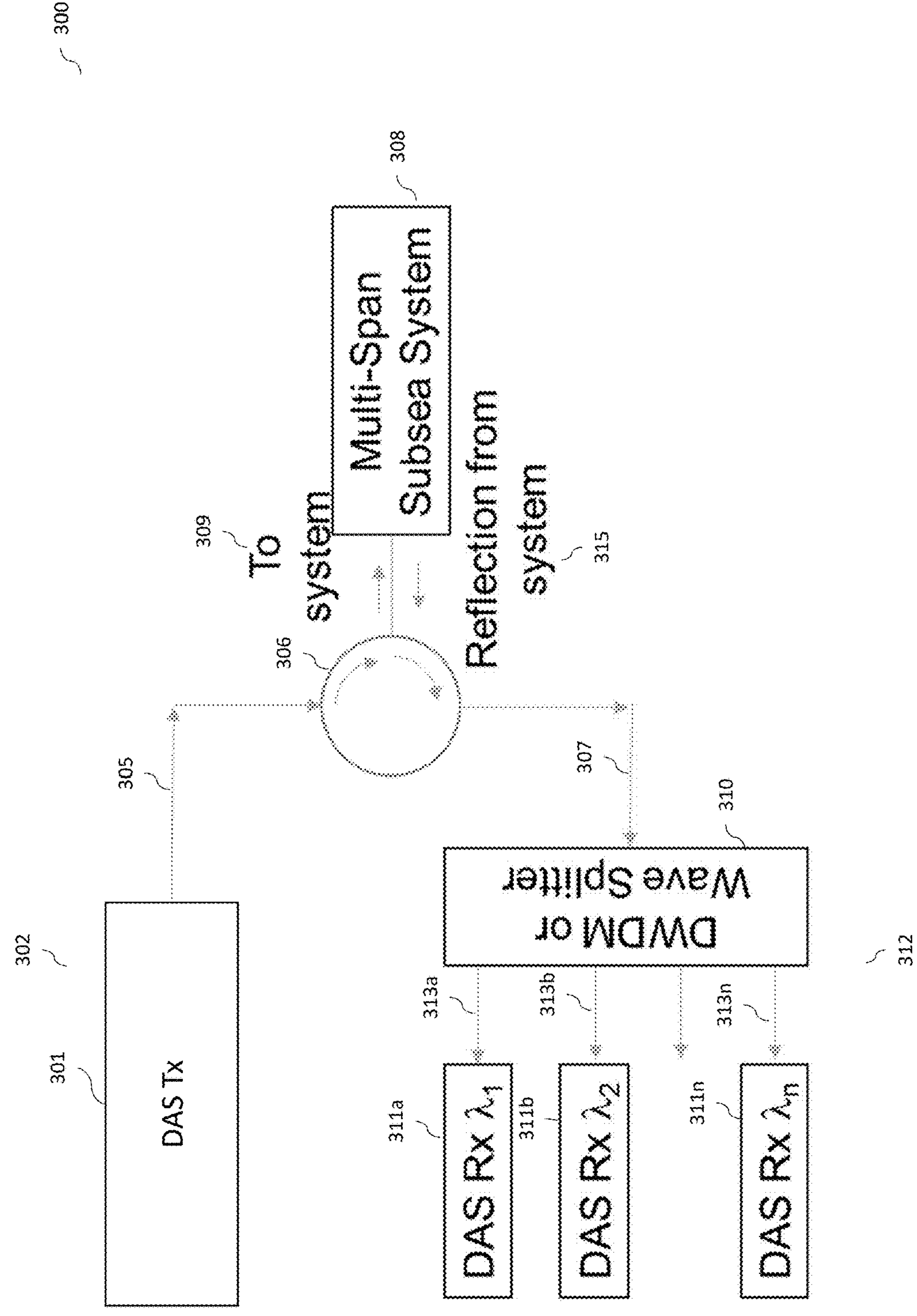
FIG. 3 illustrates an example of a sensing system that implements a single DAS transmitting component of a DAS interrogator unit to perform multi-span sensing, according to some implementations of the current subject matter.

FIG. 3 illustrates an example of a sensing system 300 that implements a single DAS transmitting component of a DAS interrogator unit to perform multi-span sensing, according to some implementations of the current subject matter. The system 300 may be used in a subsea environment and/or terrestrial environment. In particular, the system 300 may be used in DAS environments for monitoring a span and/or a section of one or more optical paths and/or links that might not be directly communicatively coupled to a DAS interrogator unit.

In some implementations, in operation, to perform monitoring of a sensing span encompassing one or more optical paths and/or portions thereof, a transmitter of an interrogation unit may be configured to generate an interrogation pulse that may be transmitted toward a monitored optical path. As will be discussed herein, the interrogation pulse may be configured to be transmitted via various optical devices (e.g., which may include one or more of a circulator, a coupler, a combiner, and/or any other type of optical device, and/or any combination thereof). The pulse may be transmitted on an optical path toward one or more repeaters to reach a section of optical path that may be desired to be monitored.

In response to receiving the interrogation pulse from the transmitter of the interrogation unit, the sensing span may be configured to reflect and/or backscatter the interrogation pulse all along the length of the sensing span. The reflected/backscattered signal may be configured to be transmit back towards the receiver of the interrogation unit. In particular, the reflected/backscattered signal may be transmitted over various optical paths that may include one or more optical devices (e.g., which may include one or more of a circulator, a coupler, a combiner, and/or any other optical device, and/or any combination thereof). The receiver of the interrogation unit may be configured to execute analysis of the received signal to determine whether there are any interferences, interruptions, etc. in the optical path based on perturbations in the backscattered signal.

Referring to FIG. 3, the system 300 may include a DAS transmitting component side 302 having a single DAS transmitter 301, a circulator component 306, a receiving splitter component 310, and a DAS receiving component side 312 having multiple signal wavelength-based DAS receivers 311 (*a, b, . . . , n*). These components may be communicatively coupled to a DAS subsea system 308. The DAS subsea system 308 may include one or more optical fibers that may be configured to receive one or more sensing signals 305 from the transmitting side 302 of the system 300 and transmit one or more backscattered or reflected sensing signals 315 to the receiving side 312 of the system 300.

The DAS transmitter 301 may be configured to generate and transmit one or more sensing optical signals 305 to determine a status of a particular segment, portion and/or span of an optical communication path of the multi-span subsea system 308, where the system 308 may include one or more of such spans. The system 308 may be similar to the system 100 shown in FIG. 1. The signals 305 may be transmitted in a time-staggered manner, e.g., at predetermined time intervals, one after the other, etc. and/or using a predetermined schedule. The signals (and/or each signal transmitted at a specific time interval) may be transmitted using a multiple wavelength source or with a tunable laser using a predetermined wavelength and/or wavelengths, and/or predetermined frequency/ies (e.g., 200 nm/s (25 GHz/ms) to 400 nm/s (50 GHz/ms), and/or any other frequencies). The wavelength(s)/frequenc(ies) of optical sensing signals 305 generated by the transmitter 301 may be same and/or different.

The system 300 may be configured to record one or more parameters associated with the signal(s) 305, which may include, for example, wavelength, frequency, phase etc. The parameters of the signals 305 may be used to determine the span of the system 308 that received transmissions of the signals. This also allows the system 300 to track backscattering and/or reflections produced by the spans of the system 308 in response to the signal(s) 305, where the backscattering/reflections may be received by one or more receivers 311 (*a, b, . . . , n*) of the receiver side 312.

During transmission by the DAS transmitter 301, the signal(s) 305 may be passed through the circulator 306. The circulator 306 may route transmission of signal(s) 305 to the multi-span subsea system 308. Similar to the circulator 206, the circulator component 306 may include ports that may be communicatively coupled to the DAS transmitter 301 at the DAS transmitting side 302, the DAS receiving component 312 side, and the system 308. For example, the signal(s) 305 from the transmitter 301 may be received on a first port of the circulator 306 and routed by the circulator 306 to its second port communicatively coupled to the system 308. Optical sensing signals backscattered and/or reflected by one or more spans of the system 308 may be received on the second port of the circulator 306 and routed to a third port of the circulator component 306 for transmission to the DAS receiving component 312 side.

The signal(s) 305 may be routed by the circulator 306 to the system 308 as optical sensing signal(s) 309 for traversal of the spans of the system 308, as discussed herein. One or more (or all spans) may be configured to cause backscattering and/or reflections of the signal(s) 309, which may be returned to the circulator 306 as signal(s) 315. For example, the first span of the system 308 may reflect a first portion of the signal(s) 309; the second of the system 308 may reflect a second portion of the signal(s) 309; and the $n^{th}$ span of the system 308 may reflect an $n^{th}$ portion of the signal(s) 309. One or more reflections by the spans of the system 308 may be caused by one or more disturbances, interferences, cable breaks, seismic activities, and/or any other conditions. Alternatively, or in addition, optical sensing signals may be reflected by the respective spans without detection of any conditions (e.g., to indicate a normal operating status of the span of the system 308).

The reflected signals may be transmitted as signal(s) 315 to the circulator 306 and may be received on the second port of the circulator component 306. The circulator 306 may then route the reflected signal(s) 315 to its third port for transmission as reflected signal(s) 307 to the DAS receiving component 312 side. The DAS receiving component 312 may include the receiving splitter component 310 (e.g., DWDM and/or any other type of wave splitting component) that may slit the reflected signal(s) 307 into multiple receiving optical sensing signals 313 (*a, b, . . . , n*) and route them to receivers 311 (*a, b, . . . , n*).

Each receiver 311 may be configured to receive a respective reflected sensing optical signal 313 (*a, b, . . . , n*) in accordance with one or more reflected signal parameters, e.g., time, wavelength, frequency, signature(s), identification, and/or any other parameters. For example, the receiver 311*a* may be configured to receive reflected optical sensing signal 313*a* having wavelength $\lambda_1$, where the signal 313*a* may be a reflection of the signal 303*a* reflected by the first span of the system 308; the receiver 311*b* may be configured to receive reflected optical sensing signal 313*b* having wavelength $\lambda_2$, where the signal 313*b* may be a reflection of the signal 303*b* reflected by the second span of the system 308; and the receiver 311*n* may be configured to receive reflected optical sensing signal 313*n* having wavelength $\lambda_n$, where the signal 313*n* may be a reflection of the signal 303*n* reflected by the $n^{th}$ span of the system 308. Each receiver 311 may be configured to receive optical sensing signals 313 and determine a status of the corresponding span of the system 308. The DAS receiving side 312 may be configured to use one or more parameters of the received signals 313 (e.g., time, wavelength, frequency, phase, signature(s), identification, and/or any other parameters) to differentiate between each received signal and ascertain whether a particular span of the system 308 is operating and/or has an optical condition (e.g., a breach, an interference, cable break, a seismic condition, etc.).

Figure 4:
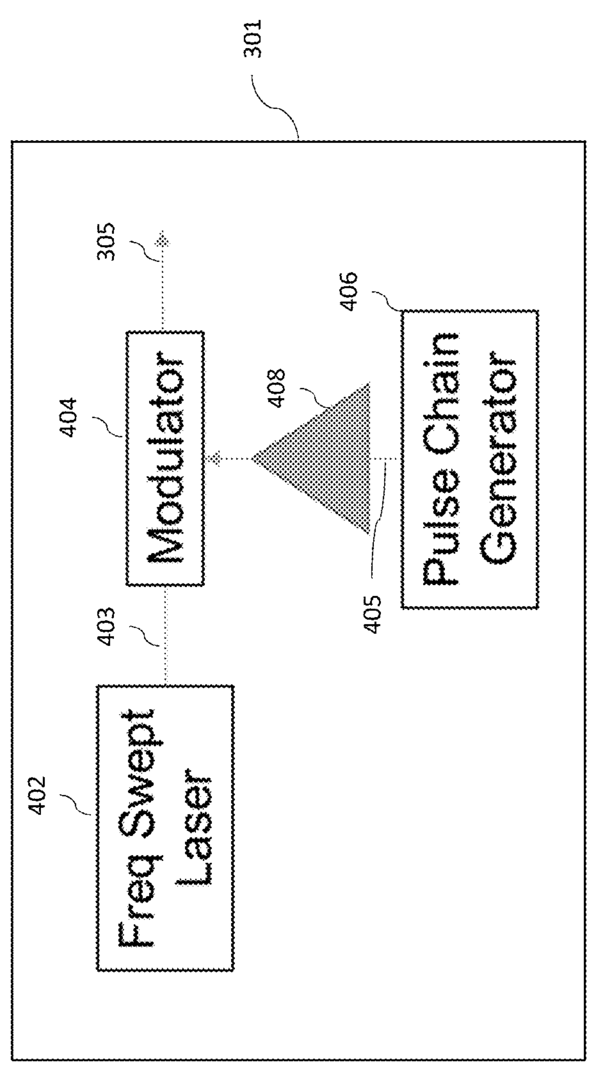
FIG. 4 illustrates an example structure of the DAS transmitter shown in FIG. 3, according to some implementations of the current subject matter.

FIG. 4 illustrates an example structure of the DAS transmitter 301 shown in FIG. 3, according to some implementations of the current subject matter. As discussed above, the DAS transmitter 301 may be communicatively coupled to the multi-span subsea system 308 (as shown in FIG. 3), which may include one or more spans of optical communication fibers that may be used for transmission of optical sensing and/or data signals.

As shown in FIG. 4, the DAS transmitter 301 may include a frequency swept laser 402, a modulator 404, a pulse chain generator 406, and a modulator driver 408. The frequency swept laser 402 may be communicatively coupled to the modulator 404. The pulse train generator 406 may be communicatively coupled to the modulator 404 via the modulator driver 408.

The frequency swept laser 402 may be configured to perform a scanning process to determine status of the optical communication path of the system 308. The scanning process may be initiated by the frequency swept laser 402 generating one or more laser/light beam signals 403. The frequency swept laser 402 may generate such light beam signals 403 using one or more predetermined frequencies and/or amplitudes. The light beam signals 403 may be continuous and/or non-continuous. Each of the light beam signals 403 generated by the frequency swept laser 402 may have a different and/or same frequency/amplitude. In some example, non-limiting embodiments, the frequency swept laser 402 may be a continuous wave laser and/or any other type of laser. Moreover, the frequency swept laser 402 may be a single frequency swept laser and/or any other type of frequency-based laser.

In some example, non-limiting implementations, the frequency swept laser 402 may be configured to generate light signals 403 having a wavelength scanning speed in the range of 10 nm/s (1.25 GHz/ms) to 1000 nm/s (125 GHz/ms). This may be accomplished using a stepper motor and/or MEMS technology. Thus, assuming 80 nm/s (10 GHz/ms) wavelength scanning speed, the frequency of the frequency-swept laser 402 may be shifted by 50 GHz in 5 ms intervals to accommodate for sensing 1000 km spans up to 100 Hz acoustic frequency range.

The signals 403 may be received by the modulator 404. The modulator 404 may be configured to modulate the light beam signals 403 received from the frequency swept laser 402 and produce one or more light pulses. The output of the modulator 404, i.e., light pulses (FIG. 2*c*), may be transmitted to the multi-span subsea system 308 as signal(s) 305. Modulation of the light beam signals 403 may be performed by the modulator 404 using one or more measurement pulses 405 generated by (and/or amplified by the modulator driver 408) the pulse train generator 406. The measurement pulses 405 may be generated by the pulse train generator 406 using one or more of the same and/or different frequencies.

In some implementations, the pulse train generator 406 may be configured to cause the modulator 404 to modulate the light beam signals 403 so that each pulse generated by the modulator 404 (using the light beam signals 403 and measurement pulse pattern) may have a different measurement frequency that may correspond to sensing a specific span of the optical communication path of the system 308.

The modulator 404 may be an acousto-optic modulator (AOM), also known as a Bragg cell or an acousto-optic deflector (AOD), which may use an acousto-optic effect to diffract and/or shift a frequency of the light beam signal 403 using one or more sound waves (e.g., at radio frequency). The modulator 404 may be an electrical absorption modulator (EAM), which may be a semiconductor device that may modulate the intensity of the light beam signals 403 using an electric voltage. Alternatively, or in addition, the modulator 404 may be an electric-optic modulator (EOM), which may be an optical device that may include a signal-controlled component that uses an electro-optic effect to modulate the light beam signals 403. As can be understood, any number and/or any combination, and/or any types of modulators may be used to modulate the light beam signals 403.

Figure 5A:
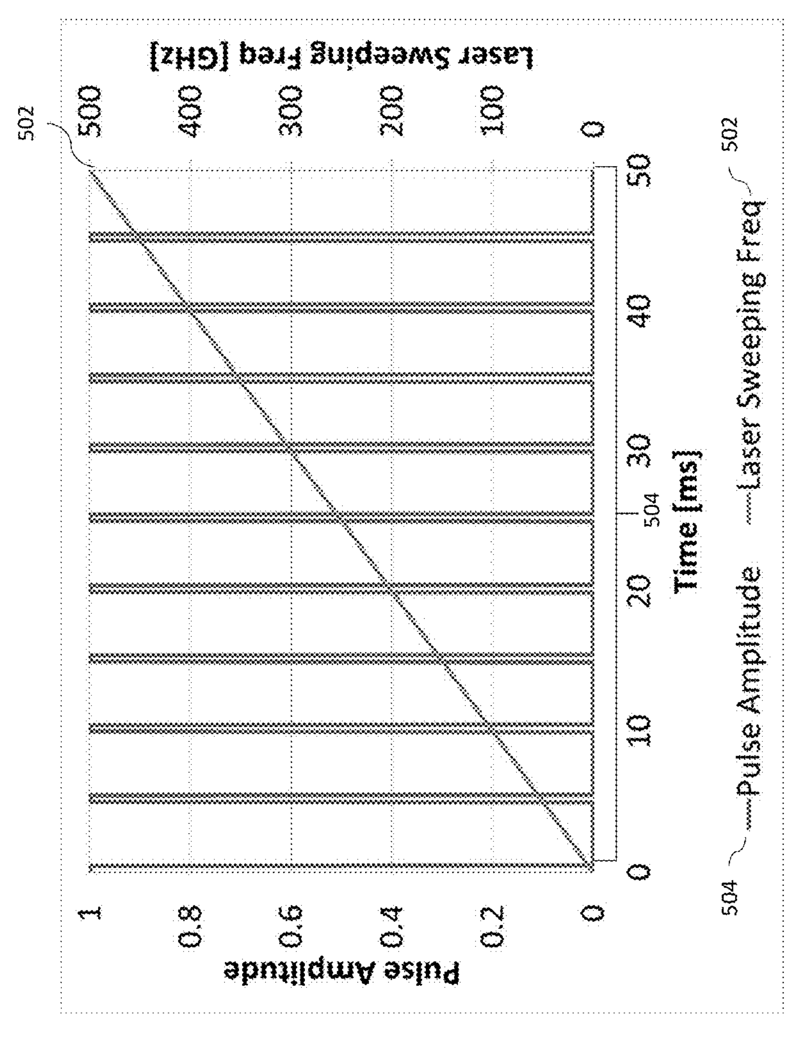
FIG. 5*a* illustrates an example plot showing a continuously increasing laser sweeping frequency generated using the frequency swept laser shown in FIG. 4, according to some implementations of the current subject matter.
Figure 5B:
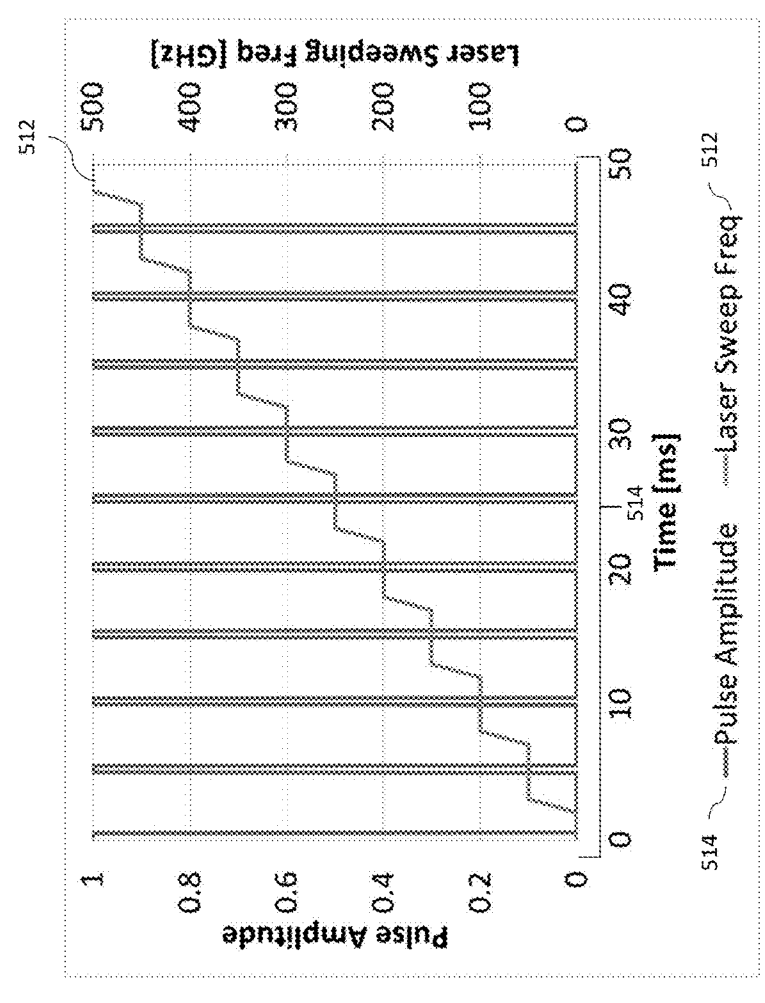
FIG. 5*b* illustrates an example plot showing a frequency that increases in a step-like fashion as generated using the frequency swept laser shown in FIG. 4, according to some implementations of the current subject matter.

The modulator 404 may be configured to generate any number of pulses from the light beam signals 403 using the measurement pulse pattern produced by the pulse chain generator 406. The pulse frequencies may be continuous (e.g., continuous frequency sweep, as shown in FIG. 5*a*) and/or time-staggered (e.g., step frequency sweep, as shown in FIG. 5*b*). Moreover, in some example, non-limiting implementations, the pulse frequencies may be generated to be one after the other using one or more predetermined intervals, e.g., 50 GHz, within a predetermined sweeping window, e.g., 500 GHz, and during a predetermined period of time, e.g., 50 ms, so that the light beam signals 403 generated by the laser 402 may be used to determine a status of optical communication path having a predetermined length, e.g., 10,000 km, where each signal is designed to cover a predetermined segment of the link, e.g., 1000 km. Thus, a first pulse (e.g., 50 GHz; 5 ms) generated based on the laser beam signal(s) 403 may be used to sense whether there are any optical conditions (e.g., cable breaks, interferences, seismic events, etc.) on a first segment of the optical communication path (e.g., from 0 km to 1000 km); a second pulse (e.g., 100 GHz, 10 ms) may be used to sense a second segment (from 1001 km to 2000 km); . . . and a tenth or last pulse (e.g., 500 GHz, 50 ms) may be used to sense a tenth or last segment (from 9001 km to 10,000 km).

Each of the generated pulses may be transmitted to and/or repeatered/re-repeatered (e.g., using one or more repeaters/EDFAs as shown in FIG. 1) in accordance with a specific span of the optical communication path that a particular pulse is designed to sense. The spans may backscatter and/or reflect the pulses, which may be received by the receiving side 312 of the DAS interrogator unit (as shown in FIG. 3). The receiving side 312, and in particular, its DAS receivers 311, may be used to process the backscattered/reflected signals (after passing through the splitter 310) in accordance with the wavelengths of such signals. For example, the DAS receiver 311*a* (as shown in FIG. 3) may be configured to process signal(s) that have been backscattered/reflected by the first segment (e.g., from 0 km to 1000 km) of the optical communication path of the system 308 in response to the first pulse (e.g., 50 GHz; 5 ms); the DAS receiver 311*b* (as shown in FIG. 3) may be configured to process signal(s) that have been backscattered/reflected by the second segment (e.g., from 1001 km to 2000 km) of the optical communication path of the system 308 in response to the second pulse (e.g., 100 GHz; 10 ms); and so on. As can be understood, a single DAS receiver may be used to process all backscattered/reflected signals from all spans of the optical communication path of the system 308.

Once the end of the sweeping window (e.g., 500 GHz, 50 ms) has been reached, the scanning process may be repeated starting from the first segment and, hence, the first pulse. Alternatively, or in addition, the scanning process may be repeated from the end of the sweeping window and/or as desired. The scanning processes may be performed continuously, performed at predetermined times, performed periodically, and/or performed at any desired time. In some implementations, the frequencies of the light beam signals 403 generated by the laser 402 may vary for each scanning process and/or for each sweep. Moreover, the patterns of the measurement signals 405 generated by the pulse chain generator 406 may likewise vary from one scanning process to the other and/or between sweeps.

FIGS. 5*a* and 5*b* are example pulse amplitude versus time versus laser sweeping frequency plots of the signals generated based on the light beam signals 403 and measurement signals 405 generated by the pulse train generator 406. In particular, FIG. 5*a* illustrates a plot 500 showing laser sweeping frequency 502 that continuously increases from 0 to 500 GHz, at a rate of 50 GHz. As shown in FIG. 5*a*, the DAS transmitter 302 may generate 10 pulses (in accordance with the measurement signals 405 pattern generated by the pulse train generator 406), with the plot 500 showing the amplitude of each pulse 504 as a vertical bar.

FIG. 5*b* illustrates a plot 510 showing laser sweeping frequency 512 that also continuously increases in a step-like fashion (e.g., staggered in time) from 0 to 500 GHz, at a rate of 50 GHz. Again, the DAS transmitter 302 may generate 10 pulses (in accordance with the measurement signals 405 pattern generated by the pulse train generator 406), with the plot 510 showing the amplitude of each pulse 514 as a vertical bar. The stepped sweeping frequency may be accomplished using, for example, a stepper motor and/or MEMS that may be incorporated into the DAS transmitter 302 (e.g., into the pulse chain generator 406).

As can be understood, any desired laser sweeping frequencies may be used. For example, sweeping laser frequencies of up to 16,000 nm/s (2 THz/ms) may be achieved by the DAS transmitter 302 through use of MEMS laser technology. This may also enable the stepped instantaneous sweeping frequencies shown in FIG. 5*b*.

Referring back to FIG. 4, in some implementations, the pulse chain generator 406 may align the measurement pulses with light beam signals 403 generated by the laser 402, where the laser 402 may be more stable in power and frequency. This may allow the frequency offset between one or more local oscillator(s) (LO) in the DAS receiving side 312 (as shown in FIG. 3) and one or more Rayleigh reflection signal(s) from one or more spans generated in response to the signals 305 to be more stable. This may further allow one or more digital signal processors of the DAS receiving side 312 to track large frequency offset(s) if coherent detection is used.

In some implementations, the current subject matter may be configured to implement frequency chirping as part of generating the signal pulses transmitted by the transmitter 301. For example, a frequency chirp may be introduced as part of one or more pulses transmitted to one or more spans in the system 308. The frequency chirp may be introduced by the modulator 404 (e.g., an electro-optic modulator (EOM), an acousto-optic modulator (AOM) and/or any other modulator).

Figure 6B:
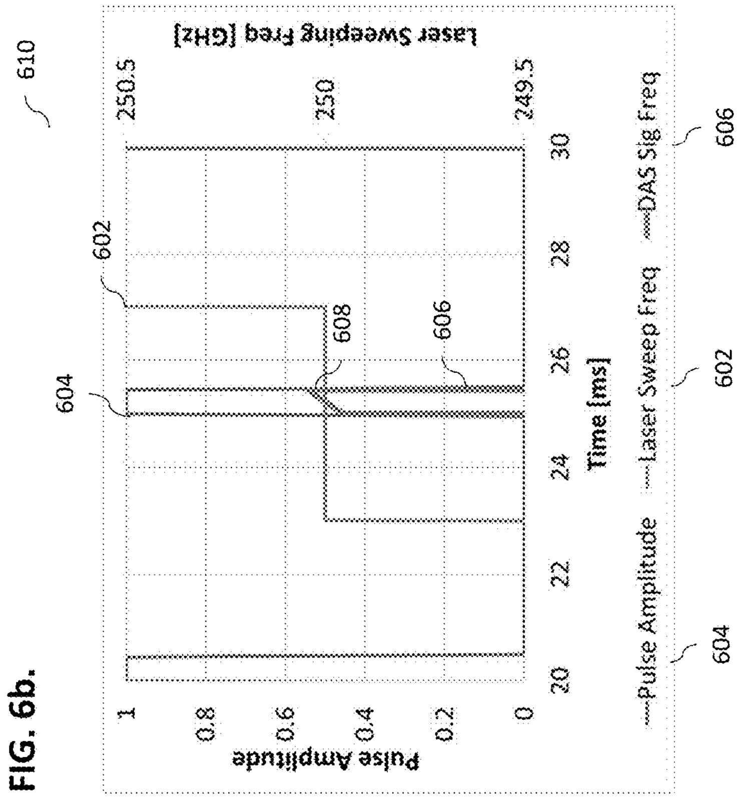
FIG. 6*b* is a plot showing an enlargement of a section of the plot in FIG. 6*a;*
Figure 6A:
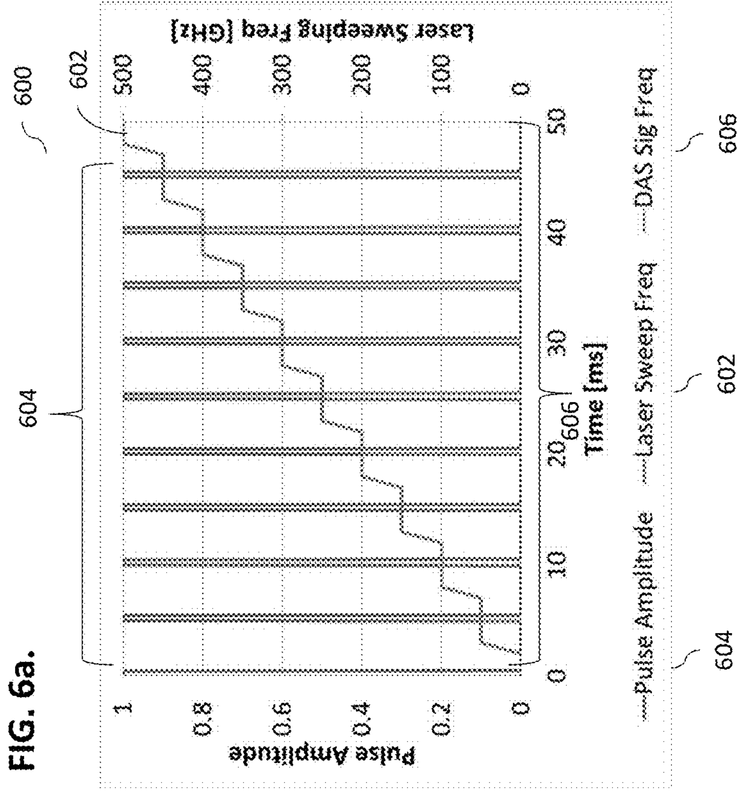
FIG. 6*a* illustrates an example plot shown in FIG. 5*b* with both the laser sweeping frequency and the DAS signal frequency increasing in a step-like fashion, according to some implementations of the current subject matter.

FIGS. 6*a-b* are example pulse amplitude versus time versus laser sweeping frequency plots of the signals generated based on the light beam signals 403 and measurement signals 405 generated by the pulse train generator 406, where frequency chirp is being introduced by the modulator 404. In particular, FIG. 6*a* illustrates a plot 600 showing laser sweeping frequency 602 that increases in a step-like fashion from 0 to 500 GHz, at a rate of 50 GHz. As shown in FIG. 6*a*, the DAS transmitter 302 may generate 10 pulses (in accordance with the measurement signals 405 pattern generated by the pulse train generator 406), with the plot 600 showing the amplitude of each pulse 604 as a vertical bar. Moreover, the plot 600 shows a corresponding DAS signal frequency 606.

The plot 610, shown in FIG. 6*b*, is an enlarged view of the signals, and in particular, the frequency chirp 608, that may be introduced during the 20-30 ms time period and between 249.5 GHz and 250.5 GHz frequency interval. The frequency signal chirp 608 (+/−50 MHz) may be introduced within a pulse. The laser frequency 602 may remain uniform during this pulse. In some example implementations, the frequency chirp's frequency range may be a few MHz up to 100 MHz, which may be much smaller than the frequency shift that may occur due to laser scanning. The frequency of the frequency chirp 608 may be adjusted to achieve different measurement spatial resolution. At the DAS receiver(s) 311, the chirped-pulse train may be correlated with a local pulse train that may have the same chirp function. This may allow enhancement of sensitivity of detecting of optical events (e.g., cable breaks, interference, seismic events, etc.).

In some implementations, in order to implement coherent detection in the DAS receiver, a local oscillator (LO) may be included in one or more receivers 311 and/or be communicatively coupled to one or more receivers 311. The local oscillator may be implemented with one or more single frequency laser signal sources. Alternatively, or in addition, a single multi-tone laser signal source may be used. In the latter case, a DWDM and/or a similar optical element may be used to separate different reflected signals and route them to appropriate DAS receivers 311.

Figure 7B:
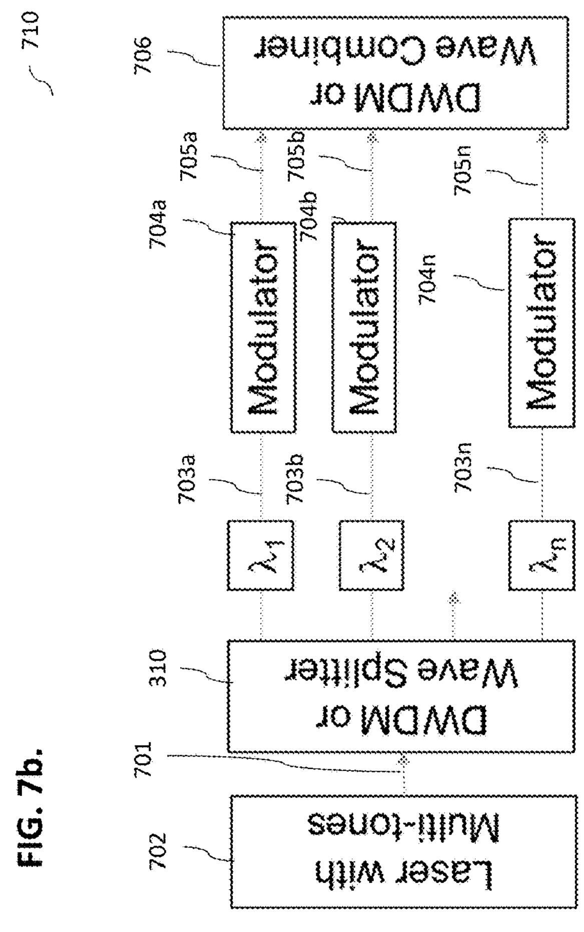
FIG. 7*b* illustrates the multi-tone laser source of FIG. 7*a* used as a muti-wavelength laser source on a transmitter side of the system shown in FIG. 3, according to some implementations of the current subject matter.
Figure 7A:
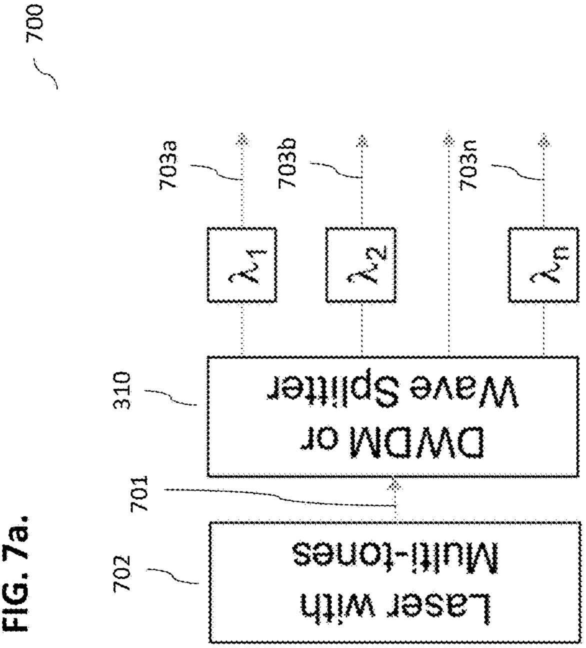
FIG. 7*a* illustrates an example of a multi-tone laser source used as a multi-wavelength local oscillator for coherent detection on a receiver side of the system shown in FIG. 3, according to some implementations of the current subject matter.

FIG. 7*a* illustrates a multi-tone laser source can be used as the multi-wavelength local oscillator on the receiver side 312 of the system 300 shown in FIG. 3, according to some implementations of the current subject matter. The system 700 may include a laser source 702 that may be configured to generate multi-tone signals 701 that may be transmitted to the splitter 310. The splitter 310 may be a DWDM and/or any other type of splitter that may split the multi-tone signals 701 into multiple signals 703 (*a, b, . . . , n*), where each signal 703 may have its own wavelength (e.g., $\lambda_1, \lambda_2, \ldots, \lambda_n$). The source 702 may be the same and/or different source as the laser 402 shown in FIG. 4. The signals 703 may then be transmitted to the DAS receivers 311 (shown in FIG. 3) to enable coherent detection of the signals 313 that are reflected and/or scattered back from the respective spans of the optical communication path. This may enable more accurate determination of the status of the spans of the system 308.

FIG. 7*b* illustrates that the same multi-tone laser source can be used as the multi-wavelength laser source on the transmitter side 302 of the system 300, according to some implementations of the current subject matter. Similar to the system 700, the system 710 may include the laser source 702 that may generate multi-tone signals 701 that may be transmitted to the splitter 310 that may split the multi-tone signals 701 into multiple signals 703 (*a, b, . . . , n*), each having a different wavelength (e.g., $\lambda_1, \lambda_2, \ldots, \lambda_n$). The signals 703 may then be passed to respective modulators 704 (*a, b, . . . , n*), which modulate the signals 703. The modulators 704 may be similar to the modulator 404 shown in FIG. 4. The modulators 704 output respective modulated signals 705 (*a, b, . . . , n*), which may then be combined using a combiner 706 into a multiple-wavelength signal that may be transmitted to the circulator 306 shown in FIG. 3. The combiner 706 may be a DWDM and/or any other type of signal combiner. The combined signal that has been output by the combiner 706 may be sent to the system to be measured via circulator 306 to sense different spans of the optical communication path 308 shown in FIG. 3.

Figure 8:
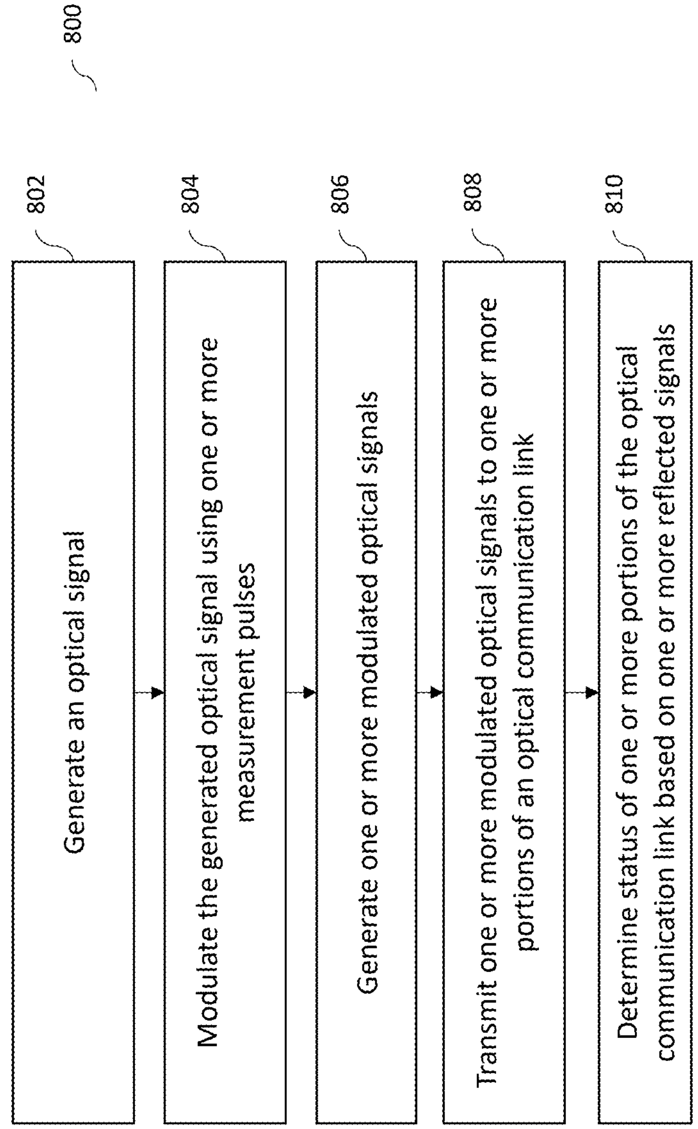
FIG. 8 illustrates an example method, according to some implementations of the current subject matter.

FIG. 8 illustrates an example process 800 for monitoring an optical transmission path in an optical transmission system, according to some implementations of the current subject matter. The method 800 may be performed by a DAS interrogation unit (e.g., the system 300 shown in FIG. 3). In particular, the monitoring may be performed by components, such as, the transmitter 301 and receiver(s) 311, as well as any other devices, including various processors.

At 802, the DAS interrogation unit (e.g., system 300) may be configured to generate an optical signal. The signal may be generated using one or more lasers 402 as shown in FIG. 4, and/or multi-tone laser source 702, as shown in FIG. 7*b*. The laser(s) 402/702 may be disposed in the transmitter side of the DAS interrogator unit (e.g., system 300). The laser may be a frequency swept laser, be a continuous wave laser and/or any other type of laser. Moreover, the laser(s) 402/702 may be a single frequency swept laser and/or any other type of frequency-based laser.

At 804, the generated optical signal(s) may be modulated using one or more measurement pulses. For example, as shown in FIG. 4 (and/or FIG. 7*b*), the optical signal(s) 403 generated by the laser(s) 402/702 may be modulated using the modulator 404. Modulation by the modulator 404 may be achieved based on one or more measurement pulses 405 generated by the pulse chain generator 406. As result of the modulation of the signals, one or more modulated optical signals may be generated for transmission to one or more spans or portions of the optical communication path, at 806.

At 808, the modulated optical signal(s) may be transmitted to one or more spans or portions of the optical communication path. The modulated optical signal(s) may be used to determine status of a specific portion of the optical communication path, at 810. The status of the portion(s) of the optical communication path may be determined at the receiving side of the DAS interrogation unit using one or more reflected and/or backscattered signals that are reflected by the portion(s) of the optical communication path that received the modulated signal(s) and generated such reflected/backscattered signal in response. The receiving side of the DAS interrogation unit may analyze the reflected/backscattered signal to determine status of the portion(s) of the optical communication path. The analysis may be performed using one or more processing systems of the receiving side of the DAS interrogation unit. An example of such a processing system may include one or more processors, a memory and/or any other storage devices, one or more communication components, one or more input/output components, and may be any combination of hardware and/or software.

The various elements of the components as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some implementations may be implemented, for example, using a machine-readable medium or article which may store an instruction or a set of instructions that, if executed by a machine, may cause the machine to perform a method and/or operations in accordance with the implementations. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or rewritable media, digital or analog media, hard disk, floppy disk, Compact Disk Read Only Memory (CD-ROM), Compact Disk Recordable (CD-R), Compact Disk Rewritable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in implementations.

At least one computer-readable storage medium may include instructions that, when executed, cause a system to perform any of the computer-implemented methods described herein.

Some implementations may be described using the expression "one implementation" or "an implementation" along with their derivatives. These terms mean that a particular feature, structure, or characteristic described in connection with the implementation is included in at least one implementation. The appearances of the phrase "in one implementation" in various places in the specification are not necessarily all referring to the same implementation. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single implementation for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separate implementation. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example implementations has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed:

1. An optical communication system, comprising:

a distributed acoustic sensing (DAS) interrogation unit, the DAS interrogation unit includes a single DAS transmitting device and a plurality of DAS receiving devices;

the single DAS transmitting device generates one or more optical signals for determining a status of one or more portions of an optical communication path;

modulates the one or more optical signals using one or more measurement pulses and generates one or more modulated optical signals; and transmits the one or more modulated optical signals to the one or more portions of the optical communication path;

the plurality of DAS receiving devices receives one or more reflected signals in response to the one or more modulated optical signals reflected by the one or more portions, wherein each DAS receiving device in the plurality of DAS receiving devices receives at least one of the one or more reflected signals in accordance with a predetermined wavelength of signals that the DAS receiving device is configured to receive; and determines the status of the one or more portions of the optical communication path based on the one or more reflected signals.

2. The system of claim 1, wherein the optical communication path is a distributed acoustic sensing optical transmission path.

3. The system of claim 2, wherein the single DAS transmitting device includes a laser source configured to generate the one or more optical signals for determining the status of the one or more portions of the optical communication path.

4. The system of claim 3, wherein the laser source includes at least one of the following: a sweeping laser, a continuous wave laser, a multi-tone frequency laser, or any combination thereof.

5. The system of claim 2, wherein the single DAS transmitting device includes a pulse generator configured to generate the one or more measurement pulses for modulating the one or more optical signals.

6. The system of claim 5, wherein the single DAS transmitting device includes a modulator configured to modulate the one or more optical signals using the one or more measurement pulses generated by the pulse generator.

7. The system of claim 6, wherein the modulator includes at least one of the following: an acousto-optic modulator, an electrical absorption modulator, an electric-optic modulator (EOM), or any combination thereof.

8. The system of claim 5, wherein a frequency of at least one modulated optical signal in the one or more modulated optical signals is determined in accordance with at least one portion of the optical communication path in the one or more portions of the optical communication path, wherein the at least one modulated optical signal is used to determine status of the at least one portion.

9. The system of claim 1, wherein the one or more optical signals include an interrogation signal.

10. A method for monitoring an optical transmission path in an optical transmission system, the optical transmission system includes a distributed acoustic sensing (DAS) interrogation unit having a single DAS transmitting device and a plurality of DAS receiving devices, the method comprising:

generating, by the single DAS transmitting device, one or more optical signals for determining a status of one or more portions of an optical communication path;

modulating, by the single DAS transmitting device, the one or more optical signals using one or more measurement pulses and generating one or more modulated optical signals;

transmitting, by the single DAS transmitting device, the one or more modulated optical signals to the one or more portions of the optical communication path;

receiving, by the plurality of the DAS receiving devices, one or more reflected signals in response to the one or more modulated optical signals reflected by the one or more portions, wherein each DAS receiving device in the plurality of DAS receiving devices receives at least one of the one or more reflected signals in accordance with a predetermined wavelength of signals that the DAS receiving device is configured to receive; and determining, by plurality of DAS receiving devices, the status of the one or more portions of the optical communication path based on the one or more reflected signals.

11. The method of claim 10, wherein the optical communication path is a distributed acoustic sensing optical transmission path.

12. The method of claim 10, wherein the single DAS transmitting device includes a laser source configured to generate the one or more optical signals for determining the status of the one or more portions of the optical communication path.

13. The method of claim 12, wherein the laser source includes at least one of the following: a sweeping laser, a continuous wave laser, a multi-tone frequency laser, or any combination thereof.

14. The method of claim 10, wherein the single DAS transmitting device includes a pulse generator configured to generate the one or more measurement pulses for modulating the one or more optical signals; and a modulator configured to modulate the one or more optical signals using the one or more measurement pulses generated by the pulse generator, wherein the modulator includes at least one of the following: an acousto-optic modulator, an electrical absorption modulator, an electric-optic modulator (EOM), or any combination thereof.

15. The method of claim 14, wherein a frequency of at least one modulated optical signal in the one or more modulated optical signals is determined in accordance with at least one portion of the optical communication path in the one or more portions of the optical communication path, wherein the at least one modulated optical signal is used to determine status of the at least one portion.

16. The method of claim 10, wherein the one or more optical signals include an interrogation signal.

* * * * *